V. Z. CARACRISTI.
VALVE CUT-OFF CORRECTION INSTRUMENT FOR LOCOMOTIVES.
APPLICATION FILED MAY 28, 1920.
1,398,256.  Patented Nov. 29, 1921.
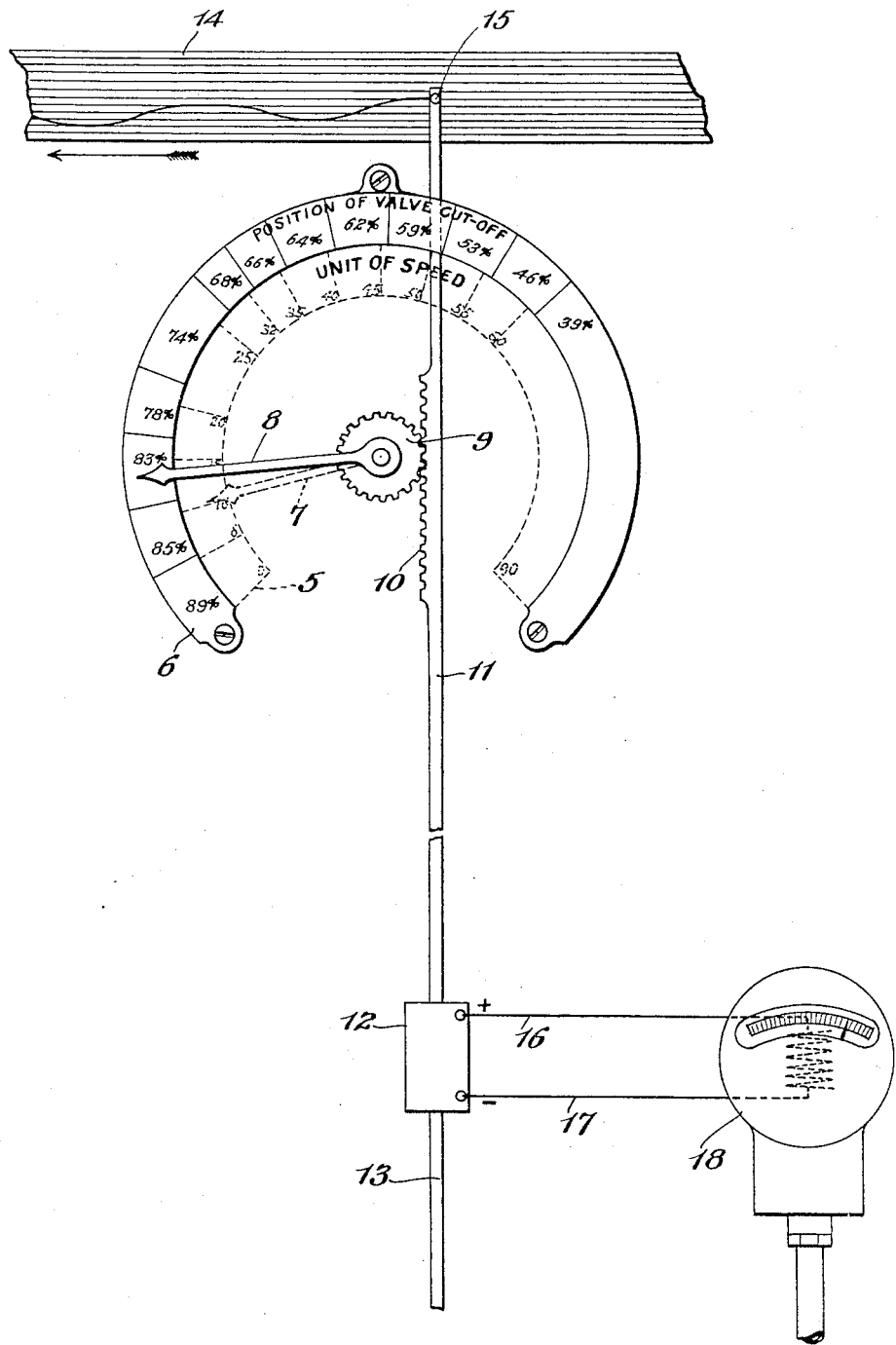
Inventor
Virginius Z. Caracristi,
By  Attorney
C. P. Goepel.

UNITED STATES PATENT OFFICE.

VIRGINIUS Z. CARACRISTI, OF BRONXVILLE, NEW YORK.

VALVE-CUT-OFF-CORRECTION INSTRUMENT FOR LOCOMOTIVES.

1,398,256.  Specification of Letters Patent.  Patented Nov. 29, 1921.

Application filed May 28, 1920. Serial No. 384,854.

*To all whom it may concern:*

Be it known that I, VIRGINIUS Z. CARACRISTI, a citizen of the United States, and resident of Bronxville, in the county of Westchester and State of New York, have invented certain new and useful Improvements in Valve-Cut-Off-Correction Instruments for Locomotives, of which the following is a description.

This invention relates to a valve cut-off correction instrument for locomotives, and has for its primary object to provide simple and reliable means for indicating to the engineer the amount of valve cut-off required in accordance with the piston stroke and speed of the engine, in order to maintain a predetermined ratio between the piston speed and point of cut-off.

More particularly, my invention contemplates the provision of a scale indicative of various degrees of valve cut-off correlated with a speed indicating scale, individual pointers or indicator hands for said scales, each of said scales being graduated to provide sections or areas indicative of engine speeds and degrees of valve cut-offs respectively and in predetermined relation to each other, and a mechanical operating connection between the pointer or hand for the valve cut-off scale and the reverse lever, whereby said hand will be moved to a position on the valve cut-off scale corresponding to the position of the other hand or pointer on the speed indicating scale when said reverse lever is actuated to adjust the cut-off valve.

The invention also has for a further object to provide automatic means for accurately effecting a variation in the operation of the valve cut-off for the different speeds in accordance with the degree of steam superheat, which may be available, so that a maximum of driving power may be obtained with a minimum consumption of the steam.

In addition to the indicating scale above referred to, I also propose to provide means for producing a permanent graphic record of the variations in the speed and valve cut-off which have occurred during a definite interval of time.

With the above and other objects in view, the invention consists generally in the combination and arrangement of the several parts, as will be hereinafter more fully set forth, illustrated in the accompanying drawings, and subsequently incorporated in the subjoined claims.

In the accompanying drawings I have diagrammatically illustrated one practical arrangement, whereby the purposes of my present invention may be successfully accomplished.

In the drawing, 5 designates a suitably graduated scale indicative of different engine speeds, which is mounted at a suitable location in the engineer's cab, where the instrument may be readily observed. In conjunction with this dial, and surrounding the same, I provide a detachable dial plate 6, which is likewise graduated, such graduations being arranged in accordance with the stroke of the cylinder pistons and the diameter of the driving wheels of the locomotive upon which the instrument is used, and indicating the different valve cut-off positions which determine the quantity of steam supplied to the engine cylinders. Therefore it will be apparent that the reading of this dial will be indirectly in terms of the piston speed in feet per minute. The graduations on the speed indicating dial 5 are preferably printed in black, while the graduations on the valve cut-off indicating dial 6 are printed in red. The graduations on these two scales are so correlated to each other that the position of the valve cut-off requisite for the admission of the necessary volume of steam to drive the locomotive at a predetermined speed will be accurately indicated upon the dial 6, and will be in such proportion to the piston stroke, as to utilize the full power from the steam so admitted to the cylinders.

The speed indicating hand or pointer 7 may be actuated by any approved mechanism such as has been heretofore employed in connection with speedometer instruments of this type, the said hand or pointer being colored black and moving over the graduated surface of the speed indicating scale 5. A second independently operable hand or pointer 8 is colored red, and moves over the graduated surface of the scale 6. Any preferred mechanical means may be employed for operatively connecting the hand or pointer 8 to the reverse lever of the locomotive. As one example of such an operating connection I have herein shown a pinion 9 fixed to the axis of the hand or pointer 8, with which the rack 10 formed on the bar 11 has meshing engagement. As will be hereinafter described, I may, in some cases, connect this rod 11 to an electrical resistance plate 12, which, in turn, is connected by the rod 13 to the reverse lever.

In the usual operation of the device, as above described, the speed of the locomotive is indicated on the scale 5 by the pointer 7. Assuming that this speed is ten miles per hour, as indicated on the drawings, and the cut-off should be 83% of the piston stroke. If the pointer 8 is not positioned in the graduation of the scale 6, indicated by the position of the pointer 7 on the scale 5, the engineer will understand that an insufficient quantity of steam is being admitted to the engine cylinders to maintain this speed, or, on the other hand, that the volume of steam being consumed is greater than that which is necessary to maintain the desired efficiency. He therefore operates the reverse lever to open or close the valve cut-off accordingly, and, until the pointer 8 occupies the same relative position on the graduations of the scale 6 as the pointer 7 occupies on the graduations of the speed indicating scale 5.

In case it is also desirable to produce a permanent record of the variations in the engine speed, and to ascertain whether or not the valve cut-off has been properly operated, a movable tape 14 may be provided above the scales of the instrument, said tape being graduated to indicate the different driving speeds. The bar 11 is extended beyond the rack 10, and the scales 5 and 6, and carries a marker 15 which marks a line upon the graduated surface of the tape 14, which is indicative of the speed curve occurring during the lapse of a definite run or interval of time, during which the locomotive has been operated. By comparing this curve with the scale 6, the various positions of the valve cut-off for the different speeds can be ascertained at any future time.

It is, of course, well known that where varying degrees of super heat are used for the propulsion of the locomotive, different degrees of opening movement of the valve cut-off are required in distinction to the degree of valve cut-off which is necessary when saturated steam is used. I have accordingly provided means for automatically compensating for varying degrees of super heat in the operation of the valve cut-off. To this end the positive and negative wires 16 and 17 respectively, of an electric circuit are connected to opposite ends of the resistance plate 12. The intensity of the electric current which is applied to the plate 12 is automatically controlled in accordance with variations in the degree of super heat by means of a pyrometer indicated at 18, and which may be of any conventional type. When this electric current heats the plate 12 by resistance to such a degree that it causes an expansion thereof, the rod 11 and the rack 10 will be moved relative to the rod 13, which is connected to the reverse lever, and there will accordingly be a movement of the hand or pointer 8 upon the scale 6 without a corresponding movement of the valve cut-off. Therefore, the engineer will operate the reverse lever to dispose the hand or pointer 8 in a position corresponding with the pointer 7, and thus actuate the cut-off valve to control the supply of super-heated steam to the engine cylinders, in accordance with the varying degrees of super-heat which may, from time to time, be produced, such variations being accurately indicated by the movement of the hand or pointer 8.

From the foregoing it will be seen that I have devised a very novel instrument for indicating to the engineer the necessary position of the valve cut-off controlling the admission of steam to the engine cylinders, in accordance with a desired predetermined speed, whereby the consumption of steam may be reduced to a minimum, resulting in the economical operation of the locomotive.

I believe that I am the first in the art produce an instrument of this character, and it is, therefore, to be understood that my present invention consists primarily in the proper correlation of the valve cut-off indicating dial and the speed indicating dial, together with the individually operable hands or pointers for the respective dials, and a suitable operating connection between the dial for the valve cut-off scale and the reverse lever of the locomotive. Though a desirable adjunct, it will be understood that the means above referred to for producing a permanent graphic record is not an essential characteristic of the invention. Likewise, if desired, the means for automatically compensating for varying degrees of superheat may also be dispensed with. Furthermore, it will be understood that the operating connections between the hand or pointer 8 and the reverse lever are merely suggestive, and any other equivalent means might be substituted therefor. Accordingly, I reserve the privilege in practice of resorting to all such legitimate changes in the form, proportion and relative arrangement of the several parts herein referred to as may be fairly embodied within the spirit and scope of the invention as claimed.

I claim:

1. The combination with a speed indicating instrument for locomotives, of an indicating device associated with the speed indicator, and to be read in conjunction with the latter, said device having means operatively connected with the valve operating means whereby the correct position of the cylinder valve cut-off can be maintained in accordance with the driving speed, as indicated by said indicating instrument.

2. The combination with a speed indicating instrument for locomotives, of an indicating device operatively associated with said instrument, and to be read in conjunction therewith, said device including a movable part, and means operatively connecting said part to the cylinder valve cut-off actuating means, whereby the valve cut-off may be correctly positioned and maintained in such position in accordance with the driving speed, as indicated by the speed indicating instrument.

3. The combination with a speed indicating instrument for locomotives having a dial and an indicator hand movable thereover, of a valve cut-off position indicating dial associated with the speed indicating dial and indicative of certain degrees of cylinder valve cut-off for different driving speeds, an indicator hand movable over the latter dial, and a mechanical operating connection between the last-named indicating hand and the reverse lever of the locomotive, whereby said indicating hand is positioned upon the second-named dial with respect to the speed indicating hand in the actuation of the reverse lever to thereby correct the cylinder cut-off and maintain the proper degree of cut-off in accordance with the driving speed, as indicated by the speed indicating instrument.

4. The combination with a speed indicating instrument for locomotives of an indicating and recording device operatively associated with said instrument, and having means operatively controlled by the reverse lever of the locomotive for correcting the position of the cylinder valve cut-off in accordance with the driving speed indicated by said instrument, and means for simultaneously producing a permanent record of the variations in the driving speed synchronously actuated upon the operation of the reverse lever to correct the position of the cylinder valve cut-off.

5. The combination with a speed indicating instrument for locomotives, of an indicating device associated with said instrument, and including means operatively connected to the reverse lever of the locomotive, whereby the position of the cylinder cut-off valve may be corrected, and such position maintained in accordance with the driving speed, as indicated by said instrument, and means for automatically varying the extent of operation of the cylinder valve cut-off, as indicated by said device, in order to correct the position of the cut-off in accordance with the varying degrees of steam super-heat which may be available.

6. In combination with a speed indicator for vehicles and actuating means for the propulsion medium-controlling valve of the vehicle; a second indicative means correlated with said speed indicator, means operatively connecting said second indicative means with the valve actuating means to operate said latter means to an extent determined by the speed indicator and thereby correctly position said valve for the propulsion of the vehicle at a desired speed.

7. In combination with an instrument having means for temporarily and permanently indicating the speed of the vehicle and means for actuating the propulsion medium-controlling valve of the vehicle; additional means correlated with the indicating means of said instrument for temporarily and permanently indicating different positions of the control valve, and means operatively connecting said latter indicative means with the valve actuating means, whereby said valve position indicating means is actuated to an extent determined by the speed indicating instrument, to thereby correctly position said valve for the propulsion of the vehicle at a desired speed.

8. In combination with a speed indicator for locomotives and actuating means for the cut-off valve of the locomotive including a reverse lever; a second indicative means correlated with said speed indicator, actuating means for said latter indicative means, and means operatively connecting said actuating means to the reverse lever and effective in the movement of said lever to shift the cut-off valve in one direction from its neutral position to thereby operate said second indicative means to an extent determined by the speed indicator, whereby the cut-off valve is positioned for the propulsion of the vehicle at a desired speed.

9. In combination with the cut-off valve of a locomotive and actuating means therefor including a reverse lever: an instrument having means for temporarily and permanently indicating various positions of the cut-off valve, means for actuating said indicating means, and means operatively connecting said actuating means to the reverse lever when the latter is operated to shift the cut-off valve from its neutral position whereby said temporary indicating means is actuated to indicate the position of said valve necessary to maintain a predetermined speed and said permanent indicating means is simultaneously actuated to produce a permanent record indicating the operation of the said temporary indicating means.

In testimony that I claim the foregoing as my invention, I have signed my name hereunder.

VIRGINIUS Z. CARACRISTI.